United States Patent [19]

House

[11] 4,435,217

[45] Mar. 6, 1984

[54] CONCENTRATED HYDROPHILIC POLYMER SUSPENSIONS

[75] Inventor: Roy F. House, Houston, Tex.

[73] Assignee: Venture Innovations, Inc., Lafayette, La.

[21] Appl. No.: 370,865

[22] Filed: Apr. 22, 1982

[51] Int. Cl.[3] .............................. C08L 1/08; C08L 1/96
[52] U.S. Cl. .................................... 106/171; 106/189; 106/197 R; 106/197 C
[58] Field of Search .................... 106/171, 197, 189

[56] References Cited

U.S. PATENT DOCUMENTS

| | | | |
|---|---|---|---|
| 4,218,262 | 8/1980 | Warren | 106/206 |
| 4,283,229 | 8/1981 | Girg et al. | 106/171 |
| 4,312,675 | 1/1982 | Pickens et al. | 106/171 |
| 4,318,746 | 3/1982 | Claffey | 106/189 |
| 4,330,414 | 5/1982 | Hoover | 106/189 |

*Primary Examiner*—Theodore Morris
*Attorney, Agent, or Firm*—Roy F. House

[57] ABSTRACT

The thermal aging stability of liquid suspensions of hydrophilic, water-soluble polymers in an organic liquid is improved by adding to the suspension a liquid fatty acid. Superior liquid polymer compositions having improved resistance to settling (syneresis), thermal aging characteristics, viscosity, and dispersibility in aqueous liquids comprise from about 40% to about 55% of an organic liquid, from about 35% to about 55% of a hydrophilic, water-soluble polymer, from about 2.0% to about 4.5% of an organophilic clay suspending agent, from about 0% to about 2.0% of a dispersant for the organophilic clay, from about 0.5% to about 2.5% of a non-ionic surfactant, and from about 1.25% to about 5.0% of a liquid fatty acid.

12 Claims, No Drawings

CONCENTRATED HYDROPHILIC POLYMER SUSPENSIONS

BACKGROUND OF THE INVENTION

The present invention relates to new improved compositions and methods for dispersing hydrophilic water-soluble polymers in aqueous liquids.

It is well known in the art that high molecular weight hydrophilic water-soluble polymers (HWSP) are very difficult to disperse or dissolve in aqueous liquids. In dissolving HWSP, conventionally, dry powdered polymer is fed slowly and carefully into the vortex of a vigorously stirred body of water. However, it is frequently difficult to do this in actual operation for a number of reasons. The desired end result is to completely separate and wet each individual polymer particle so no agglomerated particles form, commonly called fish eyes. Mechanical feeders frequently fail and are less than 100% efficient. Sifting polymers by hand is a highly tedious procedure. Often, for example, personnel tend to simply dump the powder into the water, start up the stirrer and expect the material to dissolve. Under such circumstances the polymers swell and ball up into extremely viscous masses with dry and unswollen material inside which the water cannot even reach to dissolve. Many undissolved, so-called "fish eyes," result. Fish eyes may not necessarily float. Fish eyes may also be found sinking to the bottom of the tank, depending on the density of the fish eyes and the aqueous liquid. Under normal circumstances, depending on the particular HWSP, it is impossible to get such a mass to completely dissolve even after hours or even days of stirring. For this reason, a considerable abount of work has been done attempting to develop improved and useful methods for producing dispersions and solutions of HWSP in water. Sometimes the dry powdered polymer is wetted with a water soluble organic solvent or it may be wetted with a surface active material in an attempt to improve the penetration of liquid into the particles, at the same time acting to separate them. (See, for instance, Whelan, U.S. Pat. No. 3,503,895). Considerable fractions of water soluble inert salts, such as sodium chloride or effervescing salts, may be used in order to separate the particles of polymer and reduce their tendency to ball up into insoluble masses. Mechanical feed devices and eductors operated by flowing water have been described and are commercially used for this purpose. Sometimes such devices work well with cold water, but may give considerable difficulty when used with hot water.

Other attempts to disperse HWSP include water-in-oil emulsion techniques with the polymer disposed in the water phase. This system requires an emulsion and is limited in that relatively low concentrations of water soluble polymers have been prepared in the emulsion. Further, the emulsions of this type often tend to be unstable with time.

Certain HWSP such as the various cellulose ethers, xanthan gum, guar gum and the like have been surface treated with crosslinking agents, such as glyoxal, to decrease the rate of hydration of these HWSP in aqueous liquids. In this manner, the HWSP are able to be dispersed before the polymers start to hydrate (solubilize).

Concentrated suspensions of HWSP in inert organic liquids which do not appreciably swell the HWSP have recently been introduced to the drilling industry. Such suspensions generally contain: a high concentration of HWSP; an organic suspending medium such as a hydrocarbon, a relatively high boiling alcohol, and the like; a suspending agent such as an organophilic clay; and a surfactant for enhancing the release of the HWSP into an aqueous liquid. Liquid hydroxyethyl cellulose (HEC) suspensions containing a pH stabilizer are available from NL Baroid/NL Industries, Inc. (LIQUI-VIS) and American Brine and Rental Equipment, Inc. (AMTROL). A formula and method for preparing a liquid HEC suspension published by Union Carbide Corp. consists of 1.39% BENTONE 34 organophilic clay, 0.28% methanol, 42.5% HEC-25, and 2% TERGITOL NP-10 in a hydrocarbon (diesel fuel). Their literature states that patent applications have been applied for on this technology. A formula and method for preparing a liquid HEC suspension published by Hercules Incorporated consists of 37.0% NATROSOL 250-HHW (HEC), 40.1% of an ethyl hexanol premix containing 1% KLUCEL H hydroxypropyl cellulose, 21.1% ISOPAR M oil, and 1.8% BRIJ SP35 surfactant. A formula and method for preparing a liquid xanthan gum suspension published by Kelco Div., Merck & Co., Inc. consists of 53% mineral oil, 1% EMEREST 2648 surfactant, 1% TRITON x-45 surfactant, 40% KOD85 xanthan gum biopolymer, 1% isopropyl alcohol, and 4% organophilic clay. Diesel fuel can be substituted for the mineral oil provided 7% organophilic clay is used in the liquid polymer composition.

These methods of suspending HWSP suffer from various deficiencies including: incomplete suspension of the HWSP resulting in excessive syneresis and hard packing of the HWSP on storage; an increase in viscosity (hardening) of the suspension on storage, particularly at the elevated temperatures encountered in warehouses during the summer months; and poor dispersion of the HWSP into aqueous liquids under conditions of low shear mixing.

Thus there is a need for improved suspensions of hydrophilic water-soluble polymers which overcome these problems associated with the suspensions currently available.

SUMMARY OF THE INVENTION

I have now found that the thermal hardening of liquid suspensions of hydrophilic water-soluble polymers in oleaginous liquids can be prevented by incorporating in the suspension a liquid fatty acid which is soluble or dispersible in the oleaginous liquid and a non-ionic surfactant. Preferred fatty acids contain at least six carbon atoms, most preferably eighteen carbon atoms.

I have also found that liquid suspensions of hydrophilic water-soluble polymers in oleaginous liquids having a relatively narrow composition range as hereinafter set forth have excellent thermal aging characteristics, viscosity, resistance to settling, and dispersibility in aqueous liquids.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The oleaginous liquid useful in the present invention may be any organic liquid which has no substantial swelling effect on the water-soluble polymer utilized in the invention. The preferred oleaginous liquid is a hydrocarbon, most preferably a distilled petroleum fraction having a low viscosity and high flash and fire points. Suitable hydrocarbons include light mineral oils, diesel fuel, kerosene, odorless mineral spirits, various other petroleum fractions and the like. A test to determine if an organic liquid has any appreciable swelling effect on the water-soluble polymer is to gently sift 2 grams of the polymer into a 25 milliliter graduated cylinder containing 20 milliliters of the organic liquid and observing the volume of the polymer after settling quiescent for a definite time, such as 1 week. A comparison of the volume occupied by the settled polymer with the volume of the polymer settled from a hydrocarbon, such as diesel oil, will indicate if any appreciable swelling of the polymer in the organic liquid has taken place.

The polymer useful in this invention is a water dispersible or soluble hydrophilic colloid selected from the group consisting of cellulose derivatives, starch derivatives, gum ghatti, gum arabic, gum tragacanth, locust bean gum, gum karaya, guar gum, carrageenan, algin, biopolymers, and mixtures thereof. These polymers may be used unmodified, as normally isolated from their source materials, or they may be modified by hydroxyalkylation, carboxyalkylation, or mixed hydroxyalkylation carboxyalkylation to form ether derivatives, such as hydroxyethyl ethers, hydroxypropyl ethers, carboxymethyl ethers, mixed hydroxyethyl carboxymethyl ethers, and the like, as is well known in the polymer art. Many of these derivatives form clear solutions in water. Thus the term water-soluble polymer is intended to mean polymers which form colloidal solutions or colloidal dispersions in water.

The sources of these gums are well known. Thus gum ghatti is derived from an exudate of the *Anogeissus latifolia* tree of the Combretaccae family. Gum arabic is derived from an exudate of the acacia tree. Gum tragacanth is derived from an exudate of various species of shrubs belonging to the genus Astragalus. Gum karaya is derived from an exudate of the *Sterculia ureus* tree. Locust bean gum is derived from the fruit of the carob tree (*Ceratonia siliqua*). Guar gum is derived from the seeds of two annual leguminous plants, *Cyamopsis tetragonalobus* and *Cyamopsis psoraloides*. Algin is derived from all brown seaweeds, of the family Phaeophyceae, although principally from the giant kelp *Macrosystis pyrifera*. Carrogeenan is derived from certain species of red seaweeds of the Gigartinaceae, Solieriaceae, Phyllophoraceae, and Hypneaceae families.

The biopolymers useful in this invention are biopolymers produced by a process comprising the microbial transformation of carbohydrate with a microorganism to obtain a polymeric material which differs from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Crude products having a high carbohydrate concentration can be used. Among suitable materials there may be mentioned raw sugar, crude molasses and the like. Microorganisms suitable for effecting the microbial transformation of the carbohydrates may be for example plant pathogenic bacteria such as plant pathogens which produce exudates of the site of lesions on infected plants. Typical of such microorganisms are the species of the genus Xanthomonas. Thus, for example, a heteropolysaccharide biopolymer may be prepared from glucose by the action of *Xanthomonas campestris* (XC polymer). Commercially available xanthan gum biopolymers can be obtained from Kelco Div., Merck & Co., Inc. under the trademark of "Kelzan" and General Mills, Inc. under the trademark "Biopolymer XB 23". Other species of Xanthomonas bacteria which are useful in preparing the biopolymers include *Xanthomonas phaseoli, Xanthomonas mulvacearn, Xanthomonas carotae, Xanthomonas translucens, Xanthomonas hederae* and *Xanthomonas papavericoli*. See for example Jordan U.S. Pat. No. 3,748,201, incorporated herein by reference. Other biopolymers, so-called synthetic gums, which are useful in this invention: gum dextran synthesized by the action of the bacterium known as genus Leuconostoc Van Tieghemend on sucrose, as described by Bailey et. al. in U.S. Pat. No. 2,360,237; phosphorylated mannan synthesized by the action of the yeast *Hansenula holstii* NRRL-Y2448 on glucose as disclosed in U.S. Dept. of Agriculture, Agricultural Research Service, Northern Utilization Research and Development Division, Peoria, Ill., Bulletin CA-N-7, October, 1958; gums produced by the action of diphtheriodic bacteria such as *Arthrobacter viscous* NRRL B-1973 and *Arthrobacter viscous* NRRL B-1797 as disclosed in Cadmus et al. U.S. Pat. No. 3,228,855; gum produced by the action of *methylomonas mucosa* as described in Finn et. al. U.S. Pat. No. 3,923,782; gum produced by the action of *Erwinia tahitica* as disclosed in Kang et. al. U.S. Pat. No. 3,933,788; and gum produced by the action of *Azotobacter indicus* var. Myxogenes as disclosed in Kang et. al. U.S. Pat. No. 3,960,832.

The preferred cellulose derivatives are the hydroxyalkyl, carboxyalkyl, carboxyalkyl hydroxyalkyl, and alkyl hydroxyalkyl ethers. The preferred hydroxyalkyl ethers are hydroxyethyl cellulose and hydroxypropyl cellulose. The preferred carboxyalkyl ether is carboxymethyl cellulose. The preferred carboxyalkyl hydroxyalkyl ether is carboxymethyl hydroxyethyl cellulose. The preferred alkyl hydroxyalkyl ethers are alkyl hydroxyethyl celluloses wherein the alkyl group contains from 10 to 24 carbon atoms as disclosed in Landoll U.S. Pat. No. 4,228,277, incorporated herein by reference.

Accordingly, the invention provides a liquid polymer composition wherein the polymer may preferably comprise gum ghatti, gum arabic, gum tragacanth, locust bean gum, gum karaya, guar gum, carrageenan, algin, biopolymers, hydroxyethyl cellulose, hydroxyethyl ghatti gum, hydroxyethyl arabic gum, hydroxyethyl tragacanth gum, hydroxyethyl locust bean gum, hydroxyethyl karaya gum, hydroxyethyl guar gum, hydroxyethyl carrageenan, hydroxyethyl alginate, hydroxyethyl xanthan gum, carboxymethyl cellulose, carboxymethyl ghatti gum, carboxymethyl arabic gum, carboxymethyl tragacanth gum, carboxymethyl locust bean gum, carboxymethyl karaya gum, carboxymethyl guar gum, carboxymethyl carrageenan, carboxymethyl alginates, carboxymethyl xanthan gum, hydroxyethyl carboxymethyl cellulose, hydroxyethyl carboxymethyl ghatti gum, hydroxyethyl carboxymethyl arabic gum, hydroxyethyl carboxymethyl tragacanth gum, hydroxyethyl carboxymethyl locust bean gum, hydroxyethyl carboxymethyl karaya gum, hydroxyethyl carboxymethyl guar gum, hydroxyethyl carboxymethyl carrageenan, hydroxyethyl carboxymethyl alginates, hydroxyethyl carboxymethyl xanthan gum, hydroxypropyl cellulose, hydroxypropyl ghatti gum, hydroxypropyl arabic gum, hydroxypropyl tragacanth gum, hydroxypropyl bean gum, hydroxypropyl karaya gum, hydroxypropyl guar gum, hydroxypropyl carrageenan, hydroxypropyl alginates, hydroxypropyl xanthan gum, alkyl hydroxyethyl cellulose, carboxymethyl starch, hydroxyethyl starch, hydroxyethyl carboxymethyl starch, and mixtures thereof.

The most preferred polymers for use in this invention are hydroxyethyl cellulose (HEC), carboxymethyl cellulose (CMC), carboxymethyl hydroxyethyl cellulose (CMHEC), alkyl hydroxyethyl cellulose, xanthan gum (XC polymer), and mixtures thereof, most preferably HEC. The cellulose compositions are best described in terms of "D.S." (degree of substitution) and "M.S." (molar substitution based on hydroxyethyl groups).

The purpose of the following two paragraphs is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

For the mixed ethers involved herein (i.e., CMHEC), the first value given is the carboxymethyl D.S. and the second value given is the hydroxyethyl M.S. Two types of CMHEC which are commercially available and which have been used for several years are CMHEC of 0.3 carboxymethyl D.S. and 0.7 hydroxyethyl M.S., as well as CMHEC of 0.4 carboxymethyl D.S. and 0.3 hydroxyethyl M.S. These polymers are referred to as CMHEC 37 and CMHEC 43, respectively. CMHEC 420 has a carboxymethyl D.S. of 0.4 and a hydroxyethyl M.S. of 2.

In the present invention, the M.S. for polyethoxylated cellulose ethers such as HEC is in the broad range of 0.3 to 5, preferably 2 to 3. Thus, a hydroxyethyl cellulose with a M.S. of 3 is more suitable than a hydroxyethyl cellulose ether with M.S. equal to 1.5.

The organophilic clays preferred for use in this invention comprise the reaction product of a smectite clay and an organic quaternary compound.

The smectite clay must have a cation exchange capacity of at least 75 milliequivalents per 100 grams of 100% active clay. The preferred smectite clay is montmorillonite, particularly the naturally occuring Wyoming variety of swelling bentonite. Other smectite clays which may be useful in practicing this invention are hectorite and saponite. The clays may be converted to the sodium form if they are not already in this form. This can conveniently be accomplished by preparing an aqueous clay slurry and passing the slurry through a bed of cation exchange resin in the sodium form, optionally with centrifugation to remove the non-clay impurities from the smectite clay, and spray drying the slurry to obtain a particulate form of sodium exchanged clay. Alternatively the clay can be mixed with water and a soluble sodium compound such as sodium bicarbonate, sodium carbonate, sodium hydroxide and the like, optionally with an alkaline earth metal compound selected from the group consisting of magnesium oxide, magnesium carbonate, magnesium hydroxide, calcium oxide, calcium hydroxide, and mixtures thereof, and shearing the mixture such as with a pugmill or extruder. The smectite clay may be synthesized utilizing a hydrothermal synthesis process, as is well known, however, such clays are too expensive for most industrial uses.

The cation exchange capacity of the smectite clay can be determined by the well known ammonium acetate method.

The preferred quaternary compounds comprise a quaternary ammonium salt having the structural formula

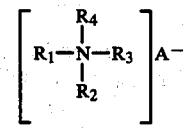

wherein $R_1$, $R_2$, $R_3$, and $R_4$ are independently selected from the group consisting of $C_aH_{2a+1-x}B_x$, $C_bH_{2b-1-x}B_x$, $C_6H_{5-x}B_xCH_2$, and mixtures thereof, $1 \leq a \leq 30$, $3 \leq b \leq 30$, $0 \leq x \leq 2$, B is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms. Most preferably $x=0$, and B is OH when $x>0$. A is preferably selected from the group consisting of Cl, Br, I, $NO_2$, OH, $CH_3SO_4$, and mixtures thereof, most preferably Cl.

Exemplary preferred quaternary ammonium cations are selected from the group consisting of trimethyl octadecyl ammonium, trimethyl hydrogenated tallow ammonium, trimethyl ricinoleyl ammonium, dimethyl didodecyl ammonium, dimethyl dioctadecyl ammonium, dimethyl dicoco ammonium, dimethyl dihydrogenated tallow ammonium, dimethyl diricinoleyl ammonium, dimethyl benzyl octadecyl ammonium, dimethyl benzyl hydrogenated tallow ammonium, dimethyl benzyl ricinoleyl ammonium, methyl benzyl dioctadecyl ammonium, methyl benzyl dihydrogenated tallow ammonium, methyl benzyl diricinoleyl ammonium, methyl benzyl dicoco ammonium, methyl dibenzyl octadecyl ammonium, methyl dibenzyl hydrogenated tallow ammonium, methyl dibenzyl ricinoleyl ammonium, methyl dibenzyl coco ammonium, methyl trioctadecyl ammonium, methyl trihydrogenated tallow ammonium, methyl triricinoleyl ammonium, methyl tricoco ammonium, dibenzyl dicoco ammonium, dibenzyl dihydrogenated tallow ammonium, dibenzyl dioctadecyl ammonium, dibenzyl diricinoleyl ammonium, tribenzyl hydrogenated tallow ammonium, tribenzyl octadecyl ammonium, tribenzyl coco ammonium, tribenzyl ricinoleyl ammonium, and mixtures thereof.

The amount of the organic quaternary cationic compound added to the clay must be sufficient to render the resulting organoclay useful for its intended purpose. Generally there is a specific ratio of clay and quaternary compound which provides the optimum desired property in an oleaginous medium, and this ratio will vary depending on the characteristics of the oleaginous medium. Thus, in general, as the aromaticity of the oleaginous medium increases, the ME ratio decreases. The ME ratio (milliequivalent ratio) is defined as the number of milliequivalents of the quaternary cationic compound in the organophilic clay, per 100 grams of clay, 100% active clay basis.

The preferred organophilic clays of this invention have a ME ratio from about 75 to about 120. The optimum ME ratio will depend on the particular clay and cationic quaternary compound used to prepare the organophilic clay, and on the particular oleaginous liquid in which it is desired to utilize the organophilic clay. In general, it has been found that the gelling efficiency of organophilic clays in polar organic liquids increases as the ME ratio decreases. Conversely, the gelling efficiency of organophilic clays in non-polar oleaginous liquids increases as the ME ratio increases until an optimum is reached which is generally in the range from about 900 to about 120 depending on the particular oleaginous liquid to be viscosified.

Preferably the organophilic clay is selected from the group consisting of dimethyl dihydrogenated tallow ammonium bentonite, methyl benzyl dihydrogenated tallow ammonium bentonite, dimethyl benzyl hydrogenated tallow ammonium bentonite, and mixtures thereof.

The organophilic clays may be prepared by known processes such as those disclosed in Finlayson et al. U.S. Pat. No. 4,287,086, incorporated herein by reference for all purposes.

Generally the organophilic clays need a dispersant in order to effectively increase the viscosity of an oleaginous liquid. The most efficient and accepted dispersants have been found to be low molecular weight alcohols, ketones, nitroalkanes, and alkylene carbonates, and mixtures thereof with water. Thus the preferred dispersant is selected from the group consisting of alcohols containing from 1 to 3 carbon atoms, ketones containing from 3 to 4 carbon atoms, nitroalkanes containing from 1 to 3 carbon atoms, alkylene carbonates containing from 3 to 5 carbon atoms, and mixtures thereof with up to about 25% by weight of water. The water may contain up to a saturation amount of a base such as sodium hydroxide, potassium hydroxide, sodium carbonate, and ammonium hydroxide, most preferably ammonium hydroxide, sodium carbonate, or mixtures thereof.

Preferably the dispersant will contain from about 5% to about 15% by weight of water optionally containing up to a saturation amount of ammonium hydroxide, sodium carbonate, or mixtures thereof.

A surfactant is included in the liquid polymer compositions of the present invention to provide a rapid release of the HWSP from the oleaginous liquid into an aqueous liquid. Thus the surfactant will, in effect, solublize the oleaginous liquid in the aqueous liquid. Since the aqueous liquid may vary from fresh water to highly saline brackish water, sea water, and even concentrated solutions of water soluble salts such as sodium chloride, potassium chloride, calcium chloride, zinc chloride, sodium bromide, potassium bromide, calcium bromide, zinc bromide, mixtures thereof, sodium carbonate, and potassium carbonate, the preferred surfactant will be effective in aqueous solutions containing such soluble salts. Moreover, the preferred surfactant will, for most end-use applications, impart a low degree of foaming to an aqueous liquid unless foaming is actually desired.

The surfactant is non-ionic and is characterized by the formula

wherein R is a hydrophobic group containing at least four carbon atoms, X is a structural element selected from the group consisting of —O—, —S—,

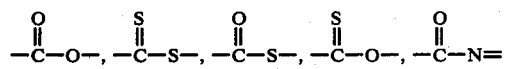

and

$(CH_2-CH_2-O)$ is ethylene oxide, n is a whole number from 0 to about 15, H is hydrogen, m is a whole number one less than the valence of the structural element X, y is a whole number, and the total number of $(CH_2-CH_2-O)$ is from 0 to about 15. Where m is two, n may be equal or unequal for each of the $(CH_2-CH_2-O)_n-H$ groups. It is preferred to employ a water soluble, non-ionic compound wherein y has a value of one. The latter compounds may be represented by the formula

Preferably the non-ionic surfactant is selected from the group consisting of ethoxylated alkyl phenols, ethoxylated fatty acids, ethoxylated fatty alcohols, acetylenic diols, and ethoxylated acetylenic diols. Exemplary of such non-ionic surfactants are octyl phenol reacted with from 0 to about 9 moles per mole of ethylene oxide, nonyl phenol reacted with from 0 to about 15 moles per mole of ethylene oxide, dodecyl phenol reacted with from 0 to about 15 moles per mole of ethylene oxide, $C_{16}-C_{18}$ fatty acids reacted with about 3 to about 15 moles per mole of ethylene oxide, $C_6-C_{18}$ aliphatic alcohols reacted with 2 to about 8 moles per mole of ethylene oxide, and 2, 4, 7, 9-tetramethyl-4, 7-dihydroxy-5-decyne reacted with from 0 to about 12 moles of ethylene oxide. Most preferably the ethoxylated alkyl phenol is selected from the group consisting of octyl phenol ethoxylated with about 2 to about 9 moles per mole of ethylene oxide, nonyl phenol ethoxylated with about 2 to about 15 moles per mole of ethylene oxide and dodecyl phenol ethoxylated with from about 3 to about 15 moles per mole of ethylene oxide.

The liquid fatty acids which are useful as thermal stabilizers in the liquid polymer compositions of this invention are soluble or dispersible in the oleaginous liquid. The acid will contain from about 6 to about 18 carbon atoms, preferably from 16 to 18 carbon atoms, and is most preferably tall oil fatty acid. The effect of the fatty acid on decreasing viscosity and increasing the thermal stability of the liquid polymer compositions of this invention is very specific. Other organic acids such as solid fatty acids, dicarboxylic acids, linear alkylaryl sulfonic acids, phosphonic acids, and the like are not effective and, indeed, have quite the opposite effect.

The liquid fatty acid and the non-ionic surfactant synergistically interact to decrease the viscosity and increase the thermal/aging stability of the liquid polymer compositions of this invention.

The liquid polymer compositions of this invention, which I have found to be superior to the liquid polymer compositions of the prior art, contain the quantities of materials listed in Table A. Within these relatively restricted composition ranges, the liquid polymer compositions are characterized by excellent dispersibility, viscosity, and stability. Thus such liquid polymer compositions will completely disperse and hydrate in water with minimal shear in less than fifteen minutes to produce viscous dispersions. These liquid polymer compositions are readily pourable and remain pourable on aging at 140° F. for over a month with no appreciable settling of the polymer and with little or no syneresis. The concentrations of each component of the compositions have been optimized to produce these advanced characteristics. Thus if the concentration of HWSP or organophilic clay is increased, the liquid polymer will be too viscous to be readily pourable. If the concentration of organophilic clay is decreased, excessive syneresis and settling of the HWSP will occur. Use of lower concentrations of HWSP necessitates the shipment of excessive quantities of inert materials (for the intended end use of the HWSP). Lower concentrations of surfactant result in a slower release of the polymer into an aqueous liquid, whereas higher concentrations of surfactant may produce excessive foam in an aqueous liquid or may reduce the thermal aging stability of the liquid polymer composition. Lower concentrations of the organic acid are not effective in enhancing the thermal aging stability, whereas larger concentrations produce an excessive decrease in viscosity on thermal aging of the liquid polymer composition. The use of a dispersant of the organoclay is not absolutely necessary but is preferred. The dispersant increases the efficiency of the organoclay in preventing syneresis of the composition. However, an excessive concentration of dispersant may either produce too high a viscosity, which can only be off-set by decreasing the organophilic clay concentration, or a slight swelling of the HWSP, both of which are undesirable.

non-ionic surfactant for enhancing the release of said polymer from the organic liquid into an aqueous liquid, the polymer, organic liquid, organophilic clay, dispersant, and non-ionic surfactant all as disclosed hereinbefore. The method comprises adding to the liquid polymer a liquid fatty acid of the type disclosed hereinbefore.

The liquid polymer compositions of the present invention may contain other materials to impart special properties of the compositions or to the aqueous liquids in which the compositions are used. Thus the liquid polymer may contain a viscosity increasing amount of benzoquinone as disclosed in Podlas U.S. Pat. No. 4,183,765, incorporated herein by reference. The liquid polymer may contain antioxidants for the polymer or the oleaginous liquid such as various combinations of alcohols or glycols and sulfur-containing antioxidants as disclosed in Wellington U.S. Pat. No. 4,218,327, incorporated herein by reference. The liquid polymer may contain bactericidal agents such as aromatic compounds as disclosed in Carter U.S. Pat. No. 4,249,608, incorporated herein by reference. The liquid polymer may contain clay stabilizing agents such as the dimethylamine-epichlorohydrin copolymers disclosed in Anderson et. al. U.S. Pat. No. 4,158,521, incorporated herein by reference. The liquid polymer composition may contain an alkaline pH stabilizer such as magnesium hydroxide. The liquid polymer may contain a sequestrant or reactant for multivalent compounds such as an alkali metal carbonate or bicarbonate, polyphosphonates, polycarboxylates, polyhydroxy carboxylates, and the like.

The invention is illustrated by, but not limited to, the compositions and methods exemplified by the following examples. All percentages are percent by weight unless otherwise indicated.

EXAMPLE 1

Various liquid polymer compositions were prepared containing 45% HEC and varying amounts of dimethyl dihydrogenated tallow ammonium bentonite, methanol (containing 5% by volume water), tall oil fatty acid, and diesel oil, as indicated in Table IA. The compositions were prepared by continuiously admixing with a Waring Blender at low speed: the diesel oil and CLAYTONE 40 organoclay for 1 minute; the methanol for 2 minutes; the TRITON X114 surfactant for 2 minutes; the ACINTOL FA-1 fatty acid for 2 minutes; and the

TABLE A

| | Liquid Polymer Compositions | | | | |
|---|---|---|---|---|---|
| | | Preferred Compositions | | | |
| Components | Operable Compositions | HWSP = All Disclosed | HWSP = HEC | HWSP = Xanthan Gum | HWSP = CMC |
| HWSP | 35–55 | 40–52.5 | 40–50 | 45–52.5 | 40–50 |
| Organo Clay | 2.0–4.5 | 2.5–3.5 | 2.5–3.0 | 2.5–3.5 | 2.5–3.0 |
| Dispersant | 0–2.0 | 0.5–1.5 | 0.5–1.5 | 0.5–1.5 | 0.5–1.5 |
| Organic Acid | 1.25–5.0 | 1.25–4.5 | 1.25–4.5 | 1.25–3.5 | 1.5–4.0 |
| Surfactant | 0.5–2.5 | 0.8–2.0 | 0.8–1.8 | 1.0–2.0 | 1.0–2.0 |
| Oleaginous Liquid | 40–55 | 40–52.5 | 45–50 | 40–50 | 42.5–52.5 |

*Based on the weight of organo clay

The invention also comprises a method of increasing the thermal aging stability of a liquid polymer composition wherein the composition comprises a hydrophilic, water-soluble polymer suspended in an organic liquid which has no appreciable swelling effect on the polymer with an organophilic clay suspending agent and, optionally, a dispersant for the organophilic clay, and a HEC-25 (Union Carbide Corp.) for 5 minutes.

The liquid polymer compositions were evaluated as follows: dispersibility—3.0 grams of liquid polymer were added to 350 milliliters of water in a pint jar and hand shaken to disperse the polymer. The dispersions were evaluated for API RP 13B rheological characteristics after periodic shaking for 15 minutes; viscosity—the time in seconds for 100 grams of the liquid polymer to flow through a funnel having the following characteristics: 5/16 inch diameter orifice, ⅞ inch stem, 3⅞ inches total height, and 130 milliliters total capacity; aging characteristics—samples of the liquid polymer compositions were aged at room temperature (72° F.) and at 140° F. The samples aged at 140° F. were spatulated after 2 days to break any temporary gel development as it was found that this hastened any syneresis which might occur and simulated handling of the liquid polymer compositions. The extent of syneresis of each sample was noted after 1 week and 4 weeks. The viscosity of each sample was measured after 1, 4, and 8 weeks at 140° F. The data obtained are given in Table IB.

The data indicate the pronounced thermal stabilizing properties of the fatty acid and the excellent characteristics of the liquid polymers having the composition of this invention. The dispersibility data is not given as the compositions of this invention were found to have excellent dispersibility which did not deteriorate upon aging the compositions at 140° F. Moreover, although syneresis occurred on extensive aging of the compositions of this invention at 140° F., no hard packing of the HEC was observed and the compositions were easily mixed by spatulation.

TABLE IA

Liquid Polymer Compositions

| Sample | % Organo-clay | % Dispersant | % Surfactant | % Aging Stabilizer* | % Diesel Oil | % HEC |
|---|---|---|---|---|---|---|
| 1-1 | 1.5 | 1.0 | 1.5 | 0 | 51.0 | 45.0 |
| 1-2 | 1.75 | 1.0 | 1.5 | 0 | 50.75 | 45.0 |
| 1-3 | 1.75 | 1.0 | 2.0 | 0 | 50.25 | 45.0 |
| 1-4 | 2.0 | 1.0 | 1.5 | 0 | 50.5 | 45.0 |
| 1-5 | 2.0 | 2.0 | 1.5 | 0 | 49.5 | 45.0 |
| 1-6 | 2.0 | 2.0 | 2.0 | 0 | 49.0 | 45.0 |
| 1-7 | 2.5 | 1.0 | 1.5 | 0 | 50.0 | 45.0 |
| 1-8 | 2.5 | 0 | 1.5 | 0 | 51.0 | 45.0 |
| 1-9 | 2.5 | 1.0 | 1.5 | 1.67 | 49.25 | 45.0 |
| 1-10 | 2.5 | 1.5 | 1.5 | 1.67 | 48.75 | 45.0 |
| 1-11 | 1.5 | 1.0 | 1.5 | 3.33 | 49.5 | 45.0 |
| 1-12 | 2.5 | 1.0 | 1.5 | 3.33 | 48.5 | 45.0 |
| 1-13 | 2.0 | 1.0 | 1.5 | 3.33 | 49.0 | 45.0 |
| 1-14 | 3.0 | 1.0 | 1.5 | 3.33 | 48.0 | 45.0 |
| 1-15 | 2.5 | 0.5 | 1.5 | 3.33 | 49.0 | 45.0 |
| 1-16 | 2.5 | 1.5 | 1.5 | 3.33 | 48.0 | 45.0 |
| 1-17 | 2.5 | 1.0 | 1.0 | 3.33 | 49.0 | 45.0 |
| 1-18 | 2.5 | 1.0 | 2.0 | 3.33 | 48.0 | 45.0 |
| 1-19 | 2.5 | 1.0 | 1.5 | 2.22 | 49.0 | 45.0 |
| 1-20 | 2.5 | 1.0 | 1.5 | 4.44 | 48.0 | 45.0 |

*Based on the weight of HEC

TABLE IB

Evaluation of Liquid Polymer Compositions

| Sample | Funnel Viscosity Initial | Weeks at 140° F. 1 | Weeks at 140° F. 4 | Weeks at 140° F. 8 | Syneresis* Aged 1 Week 72° F. | Syneresis* Aged 1 Week 140° F. | Syneresis* Aged 4 Weeks 72° F. | Syneresis* Aged 4 Weeks 140° F. |
|---|---|---|---|---|---|---|---|---|
| 1-1 | 32 | 245 | — | — | S | S | — | — |
| 1-2 | 43 | — | — | — | S | S | — | — |
| 1-3 | 45 | — | — | — | Sl | S | — | — |
| 1-4 | 50 | 300 | — | — | Sl | Sl | — | — |
| 1-5 | 305 | — | — | — | Sl | S | — | — |
| 1-6 | 360 | — | — | — | Sl | S | — | — |
| 1-7 | 150 | — | — | — | Sl | S | — | — |
| 1-8 | 37 | 155 | 248 | — | Sl | Sl | Sl | S |
| 1-9 | 55 | 123 | 145 | — | N | N | VSl | S |
| 1-10 | 72 | 79 | 150 | — | N | N | VSl | S |
| 1-11 | 15 | 18 | — | — | S | S | — | — |
| 1-12 | 46 | 45 | 55 | 79 | N | Sl | VSl | S |
| 1-13 | 14 | 15 | 13 | 19 | N | Sl | S | S |
| 1-14 | 80 | 107 | 130 | — | N | N | VSl | Sl |

TABLE IB-continued

Evaluation of Liquid Polymer Compositions

| Sample | Funnel Viscosity Initial | Weeks at 140° F. 1 | Weeks at 140° F. 4 | Weeks at 140° F. 8 | Syneresis* Aged 1 Week 72° F. | Syneresis* Aged 1 Week 140° F. | Syneresis* Aged 4 Weeks 72° F. | Syneresis* Aged 4 Weeks 140° F. |
|---|---|---|---|---|---|---|---|---|
| 1-15 | 31 | 41 | 41 | 59 | N | Sl | Sl | S |
| 1-16 | 41 | 53 | 60 | — | N | Sl | Sl | S |
| 1-17 | 37 | 27 | 27 | 31 | N | Sl | Sl | S |
| 1-18 | 41 | 52 | 230 | — | N | Sl | Sl | Sl |
| 1-19 | 47 | 79 | 161 | — | N | Sl | Sl | S |
| 1-20 | 36 | 37 | 32 | 36 | N | Sl | Sl | S |

*None = None;
VSl = Very slight syneresis;
Sl = Slight Syneresis;
S = Syneresis >5% by volume

EXAMPLE 2

Liquid polymer compositions containing 45% HEC, 2.5% dimethyl dihydrogenatedtallow ammonium bentonite, 1.0% methanol containing 5% by volume water, 1.5% octylphenol ethoxylated with 7–8 moles ethylene oxide, 1.50% tall oil fatty acid, and 48.5% diesel oil were prepared utilizing various mixing procedures as follows: Sample 2-1-The organophilic clay was added to the diesel oil in a continuously stirred Waring Blendor at low speed for 2 minutes, the methanol was added and mixed for 1 minute, the surfactant was added and mixed for 1 minute, the fatty acid was added and mixed for 1 minute, and the HEC was added and mixed for 5 minutes. Sample 2-2-Prepared as Sample 2-1 except that the fatty acid was added after the organophilic clay. Sample 2-3-Prepared as Sample 2-1 except that the surfactant was added after the organophilic clay. Sample 2-4-The methanol, surfactant and fatty acid were added simultaneously to the diesel oil and mixed 1 minute, the organophilic clay was added and mixed 2 minutes, and the HEC was added and mixed for 7 minutes. Sample 2-5-The organoclay and HEC were added simultaneously to the diesel oil and mixed 3 minutes, the surfactant was added and mixed 1 minute, the fatty acid was added and mixed 1 minute, and the methanol was added and mixed for 5 minutes. Sample 2-6-Prepared as Sample 2-4 except that only 75% of the total diesel oil was present initially with the remaining 25% being added simultaneously with the HEC. Sample 2-7-Prepared as Sample 2-1, except that the sample was mixed until the temperature reached 40° C. Sample 2-8-Prepared as Sample 2-1, except that the sample was mixed for a total of 12 minutes before adding the HEC and 2 minutes after adding the HEC. Maximum temperature was 36° C. Sample 2-9-Prepared as Sample 2-1, except that the sample was mixed before adding the HEC until the sample reached a temperature of 39° C., and thereafter mixed 5 minutes. Maximum temperature was 43° C. Sample 2-10-Prepared as Sample 2-1, except that the components were added to the diesel oil one after the other for a total mixing time of only 4 minutes. Sample 2-11-Prepared as Sample 2-1, except that the sample was mixed a long time until the temperature reached 55° C. Sample 2-12-Prepared as Sample 2-11, except that the Waring Blendor was operated at high speed throughout the mixing. Maximum temperature was 55° C. Sample 2-13-Prepared as Sample 2-1, except that the sample contained 50% HEC and 43.5% diesel oil, and the sample was mixed before adding the HEC until a temperature of 41° C. was reached followed by mixing until a final temperature of 70° C. was reached.

The samples were evaluated for viscosity and stability as in Example 1. The data obtained are given in Table 2.

TABLE 2

45% HEC, 2.5% Organoclay, 1.0% Dispersant, 1.5% Surfactant, 1.5% Aging Stabilizer, and 48.5% Diesel Oil

| Sample | Funnel Viscosity | | | | Syneresis | | | |
|---|---|---|---|---|---|---|---|---|
| | Initial | Weeks at 140° F. | | | Aged 1 Week | | Aged 4 Weeks | |
| | | 1 | 4 | 8 | 72° F. | 140° F. | 72° F. | 140° F. |
| 2-1 | 57 | 54 | 75 | 69 | N | VSL | VSL | S |
| 2-2 | 52 | 41 | 61 | 140 | N | SL | VSL | S |
| 2-3 | 53 | 42 | 51 | 73 | N | VSL | VSL | S |
| 2-4 | 50 | 40 | 55 | 88 | N | SL | VSL | S |
| 2-5 | 47 | 45 | 56 | 72 | N | VSL | VSL | S |
| 2-6 | 40 | 45 | 61 | — | SL | S | SL | S |
| 2-7 | 50 | 45 | 49 | 45 | N | SL | SL | S |
| 2-8 | 55 | 54 | 205 | N | SL | SL | S | |
| 2-9 | 45 | 35 | 29 | 47 | N | SL | SL | S |
| 2-10 | 64 | 85 | 66 | 226 | N | SL | SL | S |
| 2-11 | 35 | 36 | 29 | 70 | N | VSL | VSL | S |
| 2-12 | 27 | 32 | 30 | 205 | N | SL | VSL | S |

EXAMPLE 3

Liquid polymer compositions containing a dimethyl benzyl hydrogenatedtallow ammonium bentonite suspension agent were prepared as follows: Sample 3-1-Prepared as Sample 1-12 except that dimethyl benzyl hydrogenatedtallow was substituted for the dimethyl dihydrogenatedtallow ammonium bentonite. Sample 3-2-Prepared as Sample 1-14 except that the organophilic clay was dimethyl benzyl hydrogenatedtallow ammonium bentonite. Maximum temperature was 43° C. Sample 3-3-Prepared as Sample 3-2 except that the liquid polymer contained 45% HEC, 3.0% organophilic clay, 0.5% methanol containing 5.0% water, 1.5% surfactant, 2.0% tall oil fatty acid, and 47% diesel oil. Maximum temperature was 46° C. Sample 3-4-Prepared as Sample 3-2 except that this sample was sheared until the temperature reached 78° C.

The samples were evaluated as in Example 2. The data obtained are given in Table 3. The data indicate that these liquid polymer compositions possess excellent stability exhibiting very little syneresis and excellent thermal stability.

TABLE 3

Evaluation of Liquid Polymer Compositions 45% HEC in Diesel Oil

| Sample | % DMBHTAB* | % Dispersant | % Surfactant | % Aging Stabilizer** |
|---|---|---|---|---|
| 3-1 | 2.5 | 1.0 | 1.5 | 3.33 |
| 3-2 | 3.0 | 1.0 | 1.5 | 3.33 |
| 3-3 | 3.0 | 0.5 | 1.5 | 4.44 |
| 3-4 | 3.0 | 1.0 | 1.5 | 3.33 |

| Sample | Funnel Viscosity | | | | Syneresis | | | |
|---|---|---|---|---|---|---|---|---|
| | Initial | Weeks at 140° F. | | | Aged 1 Week | | Aged 4 Weeks | |
| | | 1 | 4 | 8 | 72° F. | 140° F. | 72° F. | 140° F. |
| 3-1 | 22 | 35 | 32 | 29 | N | VSL | N | S |
| 3-2 | 61 | 58 | 66 | 91 | N | N | N | SL |
| 3-3 | 65 | 40 | 36 | 38 | N | N | N | VSL |
| 3-4 | 39 | 50 | 52 | 89 | N | N | N | VSL |

*Dimethyl benzyl hydrogenatedtallow ammonium bentonite
**Based on the weight of HEC

EXAMPLE 4

Liquid xanthan gum (XC polymer) compositions containing various concentrations of KOD 85 xanthan gum (Kelco Div., Merck & Co., Inc.), dimethyl dihydrogenatedtallow ammonium bentonite, methanol (containing 5% by weight water) dispersant, octyl phenol ethoxylated with 7–8 moles of ethylene oxide surfactant, tall oil fatty acid aging stabilizer, and diesel oil were prepared by the procedure of Example 1.

The samples were evaluated for viscosity by the procedure of Example 1. The data obtained are given in Table 4. The data indicate the excellent thermal stabilizing characteristics of the fatty acid in these liquid polymer compositions.

TABLE 4

Liquid Xanthan Gum Compositions in Diesel Oil

| Sample | % Xanthan Gum | % DMDHTAB | % Dispersant | % Surfactant | % Aging Stabilizer* | Funnel Viscosity | | |
|---|---|---|---|---|---|---|---|---|
| | | | | | | Initial | 7 Days @ 140° F. | 4 Weeks @ 140° F. |
| 4-1 | 45.0 | 2.5 | 1.0 | 1.5 | 3.33 | 5 | 6 | 6 |
| 4-2 | 45.0 | 2.5 | 1.0 | 1.5 | 3.33 | 10 | 10 | 12 |
| 4-3 | 45.0 | 3.0 | 1.0 | 1.5 | 0 | 8 | 12 | 16 |
| 4-4 | 45.0 | 3.0 | 1.0 | 1.5 | 3.33 | 22 | 24 | 25 |
| 4-5 | 45.0 | 3.0 | 1.5 | 1.5 | 1.67 | 15 | 20 | 41 |
| 4-6 | 45.0 | 3.25 | 1.0 | 1.5 | 0 | 14 | 37 | 35 |
| 4-7 | 45.0 | 3.25 | 1.0 | 1.5 | 2.22 | 16 | 20 | 30 |
| 4-8 | 45.0 | 3.25 | 1.0 | 1.5 | 4.44 | 18 | 17 | 20 |
| 4-9 | 45.0 | 3.5 | 0.5 | 1.0 | 0 | 37 | 115 | 115 |
| 4-10 | 45.0 | 3.5 | 1.0 | 1.5 | 3.33 | 20 | 25 | 42 |
| 4-11 | 50.0 | 2.5 | 1.0 | 1.5 | 1.5 | 14 | 14 | 16 |
| 4-12 | 50.0 | 2.5 | 1.0 | 1.5 | 3.0 | 11 | 12 | 15 |
| 4-13 | 50.0 | 3.0 | 1.0 | 1.5 | 0 | 70 | 105 | 162 |
| 4-14 | 50.0 | 3.0 | 1.0 | 1.5 | 3.0 | 22 | 25 | 31 |
| 4-15 | 50.0 | 3.0 | 1.0 | 1.5 | 3.0 | 45 | 47 | 60 |
| 4-16 | 50.0 | 3.5 | 0.5 | 1.0 | 3.0 | Too Viscous | | |
| 4-17 | 55.0 | 2.5 | 1.0 | 1.5 | 0 | Too Viscous | | |
| 4-18 | 55.0 | 2.5 | 1.0 | 1.5 | 2.73 | Too Viscous | | |

*Based on the weight of xanthan gum

EXAMPLE 5

Various surfactants were evaluated in a liquid polymer composition containing 45% HEC-25, 2.5% dimethyl dihydrogenatedtallow ammonium bentonite, 1.0% methanol containing 5% by volume water, 1.5% surfactant, 1.5% tall oil fatty acid, and 48.5% diesel oil. The compositions were prepared as in Example 1 except that the compositions were mixed until the temperature reached at least 40° C. The compositions which were too viscous were diluted to 40% HEC with diesel oil.

The samples were evaluated as in Example 4. The data obtained are given in Table 5.

The data indicate that only the non-ionic surfactants are effective in this invention, specifically ethoxylated alkyl phenols, ethoxylated fatty acids, ethyoxylated fatty alcohols, acetylenic diols, and ethoxylated acetylenic diols. Ethoxylated dialkyl phenols and ethoxylated fatty amines are not effective in this invention.

TABLE 5

Effect of Various Surfactants on Viscosity/Aging Characteristics

| HYDROPHOBIC MOLECULE (HM) | Mole EO Mole HM | % HEC | Funnel Viscosity Weeks @ 140° F. 0 | 1 | 4 |
|---|---|---|---|---|---|
| ETHOXYLATED SURFACTANTS | | | | | |
| Octyl Phenol | 3 | 45 | 55 | 40 | 41 |
| Octyl Phenol | 5 | 45 | 80 | 60 | 47 |
| Octyl Phenol | 7–8 | 45 | 46 | 45 | 55 |
| Octyl Phenol | 9–10 | 45 | 55 | 60 | 132 |
| Octyl Phenol | 12–13 | 45 | 67 | 70 | 110 |
| Nonyl Phenol | 5 | 45 | 55 | 56 | 59 |
| Nonyl Phenol | 6 | 45 | 45 | 43 | 47 |
| Nonyl Phenol | 8.5 | 45 | 45 | 61 | 53 |
| Nonyl Phenol | 10 | 45 | 37 | 32 | 76 |
| Nonyl Phenol | 12 | 45 | 40 | 30 | 63 |
| Nonyl Phenol | 15 | 45 | 34 | 44 | 39 |
| Dodecyl Phenol | 5 | 45 | 42 | 45 | 70 |
| Dialkyl Phenol | 7 | 45 | 88 | 99 | 220 |
| Dialkyl Phenol | 15 | 45 | 62 | 92 | 300 |
| Dialkyl Phenol | 24 | 45 | 39 | 57 | 110 |
| Tall Oil | 10 | 45 | 36 | 40 | 51 |
| Tallow Amine | 5 | 45 | 300 | — | — |
| Mixture of C$_6$–C$_{10}$ Alcohols | 3 | 45 | 27 | 42 | 63 |
| Mixture of C$_{12}$–C$_{16}$ Alcohols | 2 | 45 | 52 | 51 | 70 |
| Mixture of C$_{12}$–C$_{14}$ Alcohols | 3 | 45 | 40 | 56 | 96 |
| 2,4,7,9-Tetramethyl-4,7-dihydroxy-5-decyne | 0 | 40 | 30 | 13 | 15 |
| | 3.5 | 45 | 40 | 31 | 34 |
| | 10 | 45 | 34 | 30 | 59 |
| OTHER SURFACTANTS | | | | | |
| Aliphatic Acid Ester | | 40 | 115 | 300 | — |
| Aromatic Acid Ester | | 45 | 55 | 138 | 222 |
| Sodium Dioctyl Sulfosuccinate | | 40 | 300 | — | — |
| Sodium Diisobutyl Sulfosuccinate | | 40 | 300 | — | — |
| Sodium Diisopropyl Naphthalene Sulfonate | | 40 | 300 | — | — |
| Sodium Salt of Linear Alkyl Benzene Sulfonic Acid | | 40 | 82 | 110 | 222 |

EXAMPLE 6

Various acids were evaluated in a liquid polymer composition containing 45% HEC-25, 2.5% dimethyl dihydrogenatedtallow ammonium bentonite, 1.0% methanol containing 5% by volume water, 1.5% octyl phenol ethoxylated with 7–8 moles ethylene oxide, 1.5% acid, and 48.5% diesel oil. The compositions were prepared as in Example 5. The compositions which were too viscous were diluted to 40% HEC with diesel oil.

The samples were evaluated as in Example 5. The data obtained are given in Table 6.

The data indicate that only the liquid fatty acids containing up to about eighteen carbon atoms are effective in this invention, preferably tall oil fatty acid.

Comparison of the data in Tables 5 and 6 indicates the unique synergistic effect of the combination of certain fatty acids and certain types of surfactants in reducing the viscosity and increasing the heat/aging stability of the liquid polymer compositions of this invention.

TABLE 6

Effect of Various Acids on Viscosity/Aging Characteristics

| | % HEC | Funnel Viscosity Weeks at 140° F. 0 | 1 | 4 |
|---|---|---|---|---|
| Fatty Acid | | | | |
| Tall Oil (ACINTOL FA-1) | 18 | 11 | 15 | 18 |
| Tall Oil (Pamak 4) | 40 | 30 | 13 | 16 |
| 95% Caprylic | 40 | 18 | 27 | 26 |
| Tallow (Ave. MW = 274, Iodine Value = 45 Max.) | 40 | 15 | 21 | 23 |
| Stearic | 40 | 300 | — | — |
| Other Acids | | | | |
| Azelaic | 40 | 64 | 300 | — |
| C$_{21}$ Dimer Acid (DIACID 1550) | 45 | 280 | — | — |
| C$_{36}$ Dimer Acid (EMPOL 1010) | 45 | 300 | — | — |
| Linear Alkyl Benzene Sulfonic (WITCO 1298) | 40 | 84 | 205 | 300 |
| Linear Alkyl Benzene Sulfonic (CYCLORYL ABSA) | 40 | 86 | 210 | 300 |

I claim:

1. A liquid polymer composition consisting essentially of from about 40% to about 55% of a liquid hydrocarbon, from about 35% to about 55% of a hydrophilic, water soluble polymer, from about 2.0% to about 4.5% of an organophilic clay, from about 0% to about 2% of a dispersant for said organophilic clay, from about 0.5% to about 2.5% of a non-ionic surfactant selected from the group consisting of octyl phenol reacted with from 0 to about 9 moles per mole of ethylene oxide, nonyl phenol reacted with from 0 to about 15 moles per mole of ethylene oxide, dodecyl phenol reacted with from 0 to about 15 moles per mole of ethylene oxide, C$_{16}$–C$_{18}$ fatty acids reacted with about 3 to about 15 moles per mole of ethylene oxide, C$_6$–C$_{18}$ aliphatic alcohols reacted with 2 to about 8 moles per mole of ethylene oxide, 2, 4, 7, 9-tetramethyl-4, 7-dihydroxy-5-decyne reacted with from 0 to about 12 moles of ethylene oxide, and mixtures thereof, and from about 1.25% to about 5.0%, based on the weight of said polymer, of a liquid fatty acid, wherein said liquid fatty acid and said surfactant synergistically interact to decrease the viscosity and increase the thermal aging stability of said composition.

2. The composition of claim 1 consisting essentially of from about 45% to about 50% of said liquid, from about 40% to about 50% of a hydroxyethyl cellulose, from about 2.5% to about 3.0% of said organophilic clay, from about 0.5% to about 1.5% of a dispersant for said organophilic clay, from about 0.8% to about 1.8% of said surfactant, and from about 1.25% to about 4.5%, based on the weight of said polymer, of said liquid fatty acid.

3. The composition of claim 1 consisting essentially of from about 40% to about 50% of said liquid, from about 45% to about 52.5% of xanthan gum bio-polymer, from about 2.5% to about 3.5% of said organophilic clay, from about 0.5% to about 1.5% of a dispersant for said organophilic clay, from about 1.0% to about 2.0% of said surfactant, and from about 1.25% to about 3.5%, based on the weight of said polymer, of said fatty acid.

4. The composition of claim 1 consisting essentially of from about 42.5% to about 52.5% of said liquid, from about 40% to about 50% of carboxymethyl cellulose, from about 2.5% to about 3.0% of said organophilic clay, from about 0.5% to about 1.5% of a dispersant for said organophilic clay, from about 1.0% to about 2.0% of said surfactant, and from about 1.5% to about 4.0%, based on the weight of said polymer, of said fatty acid.

5. The composition of claim 1 wherein said polymer is selected from the group consisting of gum ghatti, gum arabic, gum tragacanth, gum karaya, locust bean gum, guar gum, carrageenan, algin, biopolymers, the hydroxyalkylated derivatives of these polymers, the carboxyalkylated derivatives of these polymers, the mixed hydroxyalkylated carboxymethylated derivatives of these polymers, the hydroxyalkylated derivatives of cellulose and starch, the carboxyalkylated derivatives of cellulose and starch, the mixed hydroxyalkylated carboxyalkylated derivatives of cellulose and starch, and mixtures thereof.

6. The composition of claim 1, 2, 3, 4, or 5 wherein said organophilic clay is the reaction product of a quaternary ammonium salt and a smectite clay.

7. The composition of claim 1, 2, 3, 4, or 5 wherein said surfactant is selected from the group consisting of octyl phenol ethoxylated with about 2 to about 9 moles per mole of ethylene oxide, nonyl phenol ethoxylated with about 2 to about 15 moles per mole of ethylene oxide, dodecyl phenol ethoxylated with about 3 to about 15 moles per mole of ethylene oxide, $C_{16}$ to $C_{18}$ fatty acids ethoxylated with about 3 to about 15 moles per mole of ethylene oxide, $C_6$ to $C_{18}$ aliphatic alcohols ethoxylated with 2 to about 8 moles per mole of ethylene oxide, 2,4,7,9-tetramethyl-4,7-dihydroxy-5-decyne ethoxylated with from 0 to about 12 moles of ethylene oxide, and mixtures thereof.

8. The composition of claim 1, 2, 3, 4, or 5 wherein said liquid fatty acid contains from about 6 to about 18 carbon atoms.

9. The composition of claim 1, 2, 3, 4, or 5 wherein said liquid fatty acid is obtained from tall oil.

10. The method of increasing the thermal aging stability of a liquid polymer composition wherein said composition consists essentially of from about 35% to about 55% of a hydrophilic, water-soluble polymer suspended in from about 40% to about 55% of a liquid hydrocarbon which has no appreciable swelling effect on said polymer with from about 2.0% to about 4.5% of an organophilic clay suspending agent and from about 0% to about 2.0% of a dispersant for said organophilic clay, and from about 0.5% to about 2.5% of a non-ionic surfactant for enhancing the release of said polymer from said liquid hydrocarbon, said surfactant being selected from the group consisting of octyl phenol reacted with from 0 to about 9 moles per mole of ethylene oxide, nonyl phenol reacted with from 0 to about 15 moles per mole of ethylene oxide, dodecyl phenol reacted with from 0 to about 15 moles per mole of ethylene oxide, $C_{16}$ to $C_{18}$ fatty acids reacted with about 3 to about 15 moles per mole of ethylene oxide, $C_6$ to $C_{18}$ aliphatic alcohols reacted with 2 to about 8 moles per mole of ethylene oxide, 2, 4, 7, 9-tetramethyl-4, 7-dihydroxy-5-decyne reacted with from 0 to about 12 moles of ethylene oxide, and mixtures thereof, which consists essentially of adding to said composition from about 1.25% to about 5.0% based on the weight of said polymer of a liquid fatty acid sufficient to synergistically interact with said surfactant to decrease the viscosity and increase the thermal aging stability of said composition.

11. The method of claim 10 wherein said liquid fatty acid contains from about 6 to about 18 carbon atoms.

12. The method of claim 10 wherein said liquid fatty acid is obtained from tall oil.

* * * * *